United States Patent
Shon et al.

(10) Patent No.: US 11,444,876 B2
(45) Date of Patent: Sep. 13, 2022

(54) METHOD AND APPARATUS FOR DETECTING ABNORMAL TRAFFIC PATTERN

(71) Applicant: AJOU UNIVERSITY INDUSTRY-ACADEMIC COOPERATION FOUNDATION, Suwon-si (KR)

(72) Inventors: Tae Shik Shon, Gyeonggi-do (KR); Sung Moon Kwon, Daegu (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/120,390

(22) Filed: Dec. 14, 2020

(65) Prior Publication Data

US 2021/0203605 A1    Jul. 1, 2021

(30) Foreign Application Priority Data

Dec. 31, 2019  (KR) .................. 10-2019-0180015

(51) Int. Cl.
*H04L 47/127* (2022.01)
*H04L 43/18* (2022.01)
(Continued)

(52) U.S. Cl.
CPC ........ *H04L 47/127* (2013.01); *H04L 41/0681* (2013.01); *H04L 41/16* (2013.01);
(Continued)

(58) Field of Classification Search
None
See application file for complete search history.

(56) References Cited

U.S. PATENT DOCUMENTS 8,339,974 B1 * 12/2012 Dawson ............... H04L 65/608
370/255
2019/0044913 A1    2/2019 Tanida et al.
(Continued)

FOREIGN PATENT DOCUMENTS

JP    2019-33312 A    2/2019
KR    10-1711022 B1    2/2017
(Continued)

OTHER PUBLICATIONS

English Translation of Notification of Reason for Refusal dated Jan. 7, 2021 from the Korean Intellectual Property Office in Application No. 10-2019-0180015.

*Primary Examiner* — Robert M Morlan
(74) *Attorney, Agent, or Firm* — Sughrue Mion, PLLC

(57) ABSTRACT

An operating method of a computing device operated by at least one processor includes collecting traffic packets; extracting particular field data from the traffic packets, transforming the extracted particular field data to a vector with a reduced dimension for each traffic packet, and creating training data with the vector for each traffic packet; training a traffic prediction model with the training data, the traffic prediction model predicting from an input traffic packet a next input traffic packet and whether the next input traffic packet is abnormal; and predicting with the trained traffic prediction model a frequency of abnormal traffic packets to be input, and outputting an abnormal traffic warning by comparing the predicted frequency and a threshold.

13 Claims, 9 Drawing Sheets

(51) Int. Cl.
*H04L 41/16* (2022.01)
*H04L 43/04* (2022.01)
*H04L 41/0681* (2022.01)
*H04L 43/0882* (2022.01)

(52) U.S. Cl.
CPC .......... *H04L 43/04* (2013.01); *H04L 43/0882* (2013.01); *H04L 43/18* (2013.01)

(56) References Cited

U.S. PATENT DOCUMENTS

2020/0169509 A1* 5/2020 Tigli .................. H04L 47/2441
2020/0259731 A1* 8/2020 Sivaraman ............... H04L 43/12
2021/0211458 A1* 7/2021 Huang .................... H04L 69/16

FOREIGN PATENT DOCUMENTS

| KR | 10-1814368 B1 | 1/2018 |
| KR | 10-2018-0042019 A | 4/2018 |
| KR | 10-2019-0091713 A | 8/2019 |

* cited by examiner

METHOD AND APPARATUS FOR DETECTING ABNORMAL TRAFFIC PATTERN

CROSS-REFERENCE TO RELATED APPLICATION

This application claims the benefit of Korean Patent Application No. 10-2019-0180015, filed on Dec. 31, 2019, in the Korean Intellectual Property Office, the disclosures of which are incorporated herein in its entirety by reference.

BACKGROUND

1. Field

The disclosure relates to a technology for detecting an abnormal traffic pattern.

2. Description of the Related Art

Abnormal network traffic may be caused by many different reasons. For example, a new transmission control protocol (TCP) port may be aperiodically reconnected for security reasons, or when a system is established with a low-data-rate communication circuit, packets may be damaged due to network burst traffic.

A percentage of abnormal traffic among the total network traffic remains quite small, but a percentage of traffic affected by the abnormal traffic is not low. Hence, even the network traffic that occurs very rarely and aperiodically needs to be accurately detected.

There has been a technology developed for creating a white list rule to detect the abnormal network traffic.

In a case of using the white list rule, however, it is hard to determine a starting point of a traffic pattern to be applied to the next rule after abnormal traffic against the white list rule is detected. Furthermore, when a temporary network failure that may routinely occur does slightly not meet the set rule, it is detected as the abnormal traffic, and thus a false positive rate becomes high.

To make up for the shortcomings resulting from the white list rule, a recurrent neural network (RNN) may be used. With a common unidirectional RNN, however, it is difficult to predict a pattern of very rarely observed traffic.

Hence, a method by which to keep on detecting abnormal traffic even after an abnormal traffic occurs and accurately detect even the low frequency abnormal traffic is required.

SUMMARY

The disclosure provides a method of learning a network traffic pattern using a bidirectional recurrent neural network (BRNN) and detecting abnormal traffic pattern.

According to an aspect of the disclosure, an operating method of a computing device operated by at least one processor, the operating method comprising: collecting traffic packets; extracting particular field data from the traffic packets, transforming the extracted particular field data to a vector with a reduced dimension for each traffic packet, and creating training data with the vector for each traffic packet; training a traffic prediction model with the training data, the traffic prediction model predicting from an input traffic packet a next input traffic packet and whether the next input traffic packet is abnormal; and predicting with the trained traffic prediction model a frequency of abnormal traffic packets to be input, and outputting an abnormal traffic warning by comparing the predicted frequency and a threshold.

According to an exemplary embodiment, the particular field data comprises at least one of a type of data, a command type, flag information, port information, a source IP, or a destination IP included in each traffic packet.

According to an exemplary embodiment, the transforming comprises determining a type of a pattern of the collected traffic packets and transforming the particular field data for each traffic packet to a vector with a minimum dimension to distinguish the type of the pattern.

According to an exemplary embodiment, the vector comprises a one-hot vector having one element of true or '1' and the other elements of false or '0'.

According to an exemplary embodiment, the operating method further comprises receiving a series of new traffic packets in sequence and inputting the new traffic packets to the traffic prediction model; and predicting a traffic packet to come after the new traffic packets.

According to an exemplary embodiment, the operating method further comprises extracting the particular field data from the new traffic packets, transforming the particular field data to a vector, and generating a warning when the vector is different from a form of the training data, between the inputting and the predicting.

According to an exemplary embodiment, the operating method further comprises determining whether the predicted traffic packet is normal traffic; and generating a warning when the predicted traffic packet is determined to be abnormal traffic.

According to an aspect of the disclosure, a computing device comprising: a memory, and at least one processor configured to execute instructions of a program loaded in the memory, wherein the program includes instructions composed to execute the following operations: extracting particular field data from a plurality of collected traffic packets, transforming the extracted particular field data to a vector with a reduced dimension for each traffic packet, and creating training data with the vector for each traffic packet, training a traffic prediction model with the training data, the traffic prediction model predicting from an input traffic packet a next input traffic packet and whether the next input traffic packet is abnormal, and receiving a series of new traffic packets in sequence, extracting the particular field data from the new traffic packets, transforming the extracted particular field data to a vector and inputting the vector to the traffic prediction model, and predicting a traffic packet to come after the new traffic packet.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
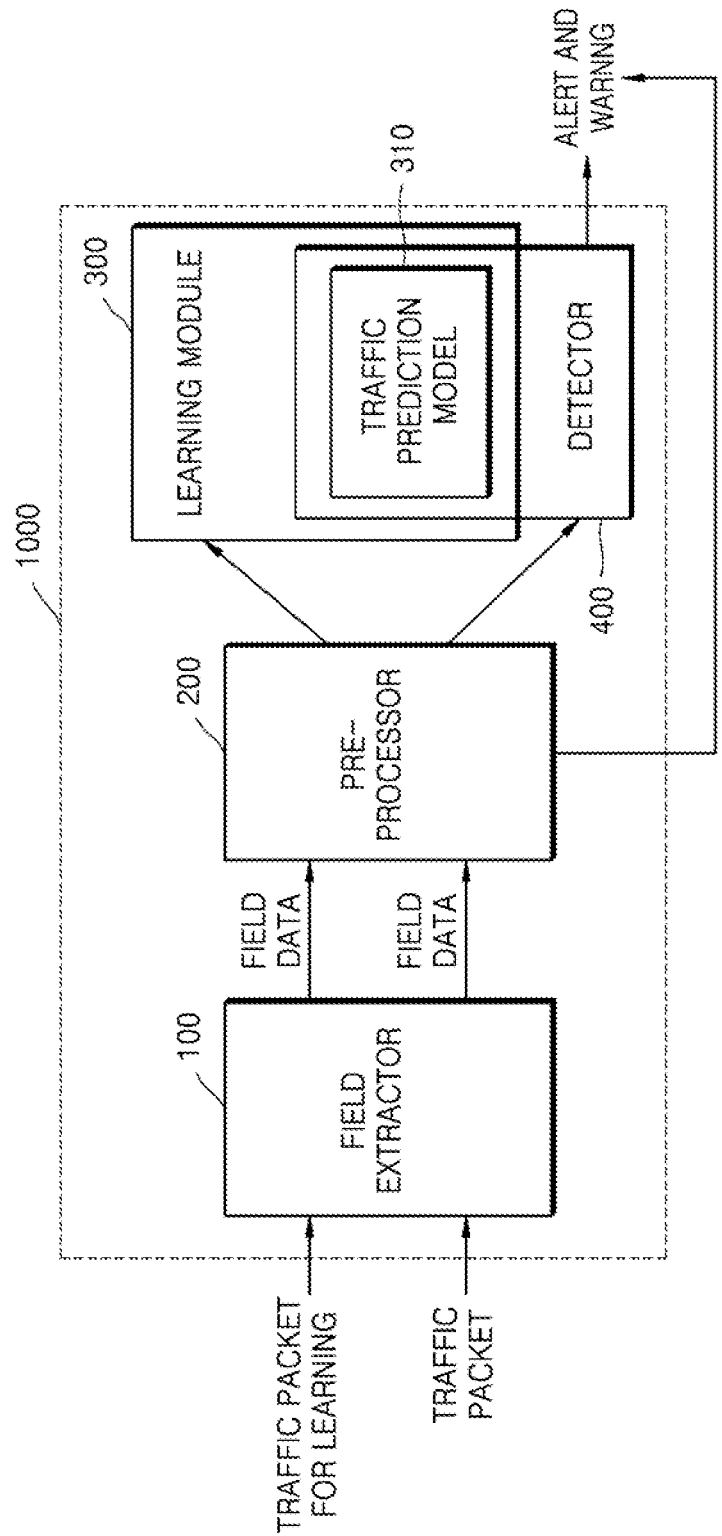
FIG. 1 is a block diagram of an abnormal traffic detection apparatus, according to an embodiment of the disclosure.

Embodiments of the disclosure will now be described in detail with reference to accompanying drawings to be readily practiced by those of ordinary skill in the art. However, the embodiments of the disclosure may be implemented in many different forms, and not limited thereto as will be discussed herein. In the drawings, parts unrelated to the description are omitted for clarity, and like numerals refer to like elements throughout the specification.

The term "include (or including)" or "comprise (or comprising)" is inclusive or open-ended and does not exclude additional, unrecited elements or method steps. "Unit", "module", "block", etc. used herein each represent a unit for handling at least one function or operation, and may be implemented in hardware, software, or a combination thereof.

FIG. 1 is a block diagram of an abnormal traffic detection apparatus, according to an embodiment of the disclosure.

Referring to FIG. 1, an abnormal traffic detection apparatus 1000 trains a traffic prediction model 310 by extracting a particular field from a traffic packet and creating a vector from an observed pattern for each field. The abnormal traffic detection apparatus 1000 may determine the frequency of the occurrence of abnormal traffic packets for a unit time, and when receiving a subsequent traffic packet, predict a packet that would come next to detect an abnormal packet, and determine whether the frequency of the occurrence of abnormal traffic packets exceeds a threshold.

The abnormal traffic detection apparatus 1000 may include a field extractor 100 for extracting a particular field from training data and a traffic packet to generate field data, a pre-processor 200 for vectorizing the field data based on a conversion rule, a learning module 300 for training a traffic prediction model 310, and a detector 400 for predicting next traffic using the trained traffic prediction model 310 and detecting abnormal traffic.

The field extractor 100, the pre-processor 200, the learning module 300, and the detector 400 are named by their respective functions, but they may correspond to a computing device operated by at least one processor. The field extractor 100, the pre-processor 200, the learning module 300, and the detector 400 may be implemented in a single computing device or separately implemented by different computing devices. In the latter case that they are separately implemented by different computing devices, the field extractor 100, the pre-processor 200, the learning module 300, and the detector 400 may communicate with each other through a communication interface. The computing device may be any device that may run a software program composed to perform operations as described in the disclosure, which may be e.g., a server, a laptop computer, etc.

The field extractor 100, the pre-processor 200, the learning module 300, and the detector 400 may each be implemented in a single artificial intelligence (AI) model or in a plurality of AI models. Furthermore, the traffic prediction model 310 may be implemented in a single AI model or a plurality of AI models. The abnormal traffic detection apparatus 1000 may be implemented in a single AI model or a plurality of AI models. The one or more AI models corresponding to the aforementioned components may be implemented by one or more computing devices.

The field extractor 100 may extract a particular filed from an input data packet. As the data packet has a huge data volume, a huge amount of computation is required to train the deep-learning model with the data packet, so a portion of data needs to be extracted. The portion of data extracted from the data packet is called field data, and the field type may be determined by an administrator and not limited to a particular type.

For example, a protocol of an application layer may select flags termed 'function code' which is an instructions set code provided by a network protocol, 'port', 'protocol', 'command', 'data type', 'FIR', 'FIN', 'SEQ', etc., as fields to be extracted, and the following description will be focused on an example of extracting a source IP and a destination IP.

The pre-processor 200 transforms the field data to a vector to be input to the traffic prediction model 310, and there are no limitations on the vector transformation method. The following description will take an example of creating a one-hot vector in a one-hot encoding method.

The one-hot encoding is a method of transforming character or categorical data to a relevant binary vector, representing all categorical variables as true or '1' or false or '0' while encoding an item in question to true or '1'.

Using the one-hot encoding, influence of computation weights or bias due to the magnitude of a value may be eliminated in a case that data expressed in text having a difference in value must not influence on model training or analysis.

For example, when the field 'IP' is extracted from a traffic packet, IPs '1.1.1.1' and '255.255.255.255' just indicate different addresses and the large numbers indicating an address has no special meaning. The large numbers, however, may influence computation of the deep-learning model, so the numerical data is transformed to a simple binary vector through the one-hot encoding.

In another example, model training may be performed by narrowing a data range according to a property of an object to be analyzed. For example, for the field 'IP', IP addresses have a wide data range from 1.1.1.1 to 255.255.255.255, and when an IP address is input directly to the deep-learning model, the deep-learning model performs computations on all available values in the data range. In this case, when an IP address that may be input or exists in reality is transformed into a one-hot vector and the one-hot vector is input to the deep-learning model, an amount of computation of the deep-learning model may be reduced and accuracy of prediction results may be improved.

Furthermore, in the disclosure, the pre-processor 200 manages transformation rules for creating a one-hot vector from a traffic packet that may be input, and in a case that an arbitrarily input traffic packet cannot be transformed into a one-hot vector, the pre-processor 200 may detect the traffic packet as abnormal traffic immediately and provide a warning. An operating method of the pre-processor 200 will be described in detail with reference to FIGS. 2 and 3.

The learning module 300 may train the traffic prediction model 310 with training data transformed into one-hot vectors. In the disclosure, the traffic prediction model 310 is trained by unsupervised learning, and accordingly the training data may not include a tag about whether the traffic pattern is normal. In the meantime, with an increase in abnormal traffic, a normal traffic pattern learning rate may decrease, so that the administrator may delete some of the abnormal traffic of the training data.

The traffic prediction model 310 learns a series of traffic patterns to predict the next traffic packet when a traffic packet is input thereto. In the disclosure, the traffic prediction model 310 may receive a traffic packet represented in a one-hot vector, and thus represent the predicted traffic packet in the form of a one-hot vector.

The traffic prediction model 310 may be implemented with an arbitrary deep-learning model, and the following description will be focused on a case that the traffic prediction model 310 is implemented with bidirectional RNNs (BRNNs).

The BRNN is a kind of RNN, which takes into account not only past states but also future states, and which is extended from the existing RNN that stores previous state information of data in the form of a memory. The BRNN has two hidden layers. There are a layer having information about forward states and a layer having information about backward states. An input value is sent to both the two hidden layers, and an output layer receives values from both the two layers and obtains a final result by computation.

The learning module 300 may figure out the frequency of detection of abnormal traffic for a unit time from the trained traffic prediction model 310 and set a threshold based on the frequency. An operating method of the traffic prediction model 310 implemented in the disclosure will be described in detail with reference to FIGS. 6A and 6B.

The detector 400 uses the trained traffic prediction model 310 to predict a traffic packet that would come next when an arbitrary traffic packet is input, and determine whether the predicted traffic packet is normal.

The detector 400 may output a warning when an abnormal traffic packet is input once, or output a warning when the frequency of prediction of abnormal traffic packets exceeds the threshold set by the learning module 300. Although the warning is provided for the user or administrator about the occurrence of an abnormal traffic packet, it is not limited thereto.

Figure 2:
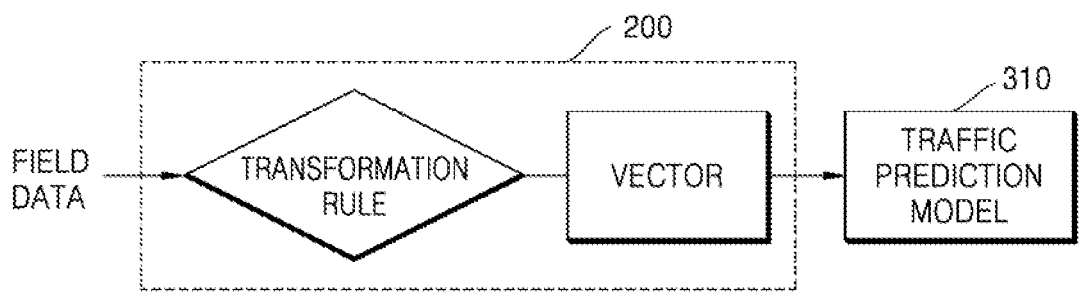
FIG. 2 is a diagram for describing how a pre-processor operates, according to an embodiment of the disclosure.

FIG. 2 is a diagram for describing how a pre-processor operates, according to an embodiment of the disclosure.

Referring to FIG. 2, the pre-processor 200 figures out a pattern in which field data is input, sets up a rule to transform the field data to a vector, transforms input field data to a vector according to the rule and inputs the vector to the traffic prediction model 310. There are no limitations on the vector transformation method, and in the disclosure the one-hot encoding is taken as an example.

Assume an occasion when there are six types of field data input to the traffic prediction model 310 and there are IP communication flows with six vectors iteratively turning up in sequence as in the following table 1.

TABLE 1

| Source IP | Destination IP | Vector transformed |
|---|---|---|
| 192.168.0.1 | 192.168.0.2 | (1, 0, 0, 0, 0, 0) |
| 192.168.0.2 | 192.168.0.1 | (0, 1, 0, 0, 0, 0) |
| 192.168.0.1 | 192.168.0.3 | (0, 0, 1, 0, 0, 0) |
| 192.168.0.3 | 192.168.0.1 | (0, 0, 0, 1, 0, 0) |

TABLE 1-continued

| Source IP | Destination IP | Vector transformed |
|---|---|---|
| 192.168.0.1 | 192.168.0.4 | (0, 0, 0, 0, 1, 0) |
| 192.168.0.4 | 192.168.0.1 | (0, 0, 0, 0, 0, 1) |

As there are 6 types of input field data pattern in the table 1, the pre-processor 200 may transform each field data to a one-hot vector in six dimensions to sort the six patterns. The dimensions of the one-hot vector may be changed depending on the type of field data to be vectorized.

Figure 3:
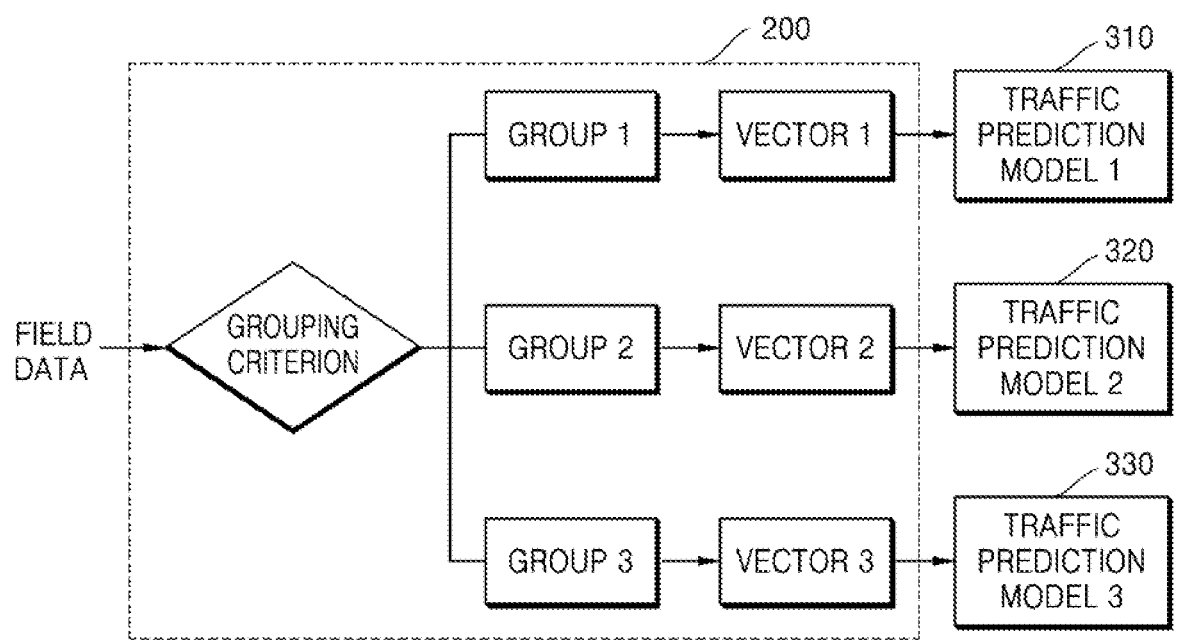
FIG. 3 is a diagram for describing how a pre-processor operates, according to another embodiment of the disclosure.

FIG. 3 is a diagram for describing how a pre-processor operates, according to another embodiment of the disclosure.

Referring to FIG. 3, the pre-processor 200 may sort field data into a plurality of groups. For example, the field data may be sorted into a plurality of groups by taking an IP communication section as a grouping criterion based on addresses of source IPs and destination IPs. Specifically, field data with an IP communication section between 192.168.0.1 and 192.168.0.2 may be sorted into group 1; field data with an IP communication section between 192.168.0.1 and 192.168.0.3 into group 2; field data with an IP communication section between 192.168.0.1 and 196.168.0.4 into group 3.

The pre-processor 200 may then transform the field data of each group into a one-hot vector as in the following table 2.

TABLE 2

| Group | Source IP | Destination IP | Vector transformed |
|---|---|---|---|
| Group 1 | 192.168.0.1 | 192.168.0.2 | (1, 0, 0, 0, 0, 0) |
|  | 192.168.0.2 | 192.168.0.1 | (0, 1, 0, 0, 0, 0) |
| Group 2 | 192.168 0.1 | 192.168.0.3 | (0, 0, 1, 0, 0, 0) |
|  | 192.168.0.3 | 192.168.0.1 | (0, 0, 0, 1, 0, 0) |
| Group 3 | 192.168.0.1 | 192.168.0.4 | (0, 0, 0, 0, 1, 0) |
|  | 192.168.0.4 | 192.168.0.1 | (0, 0, 0, 0, 0, 1) |

The dimensions of the one-hot vector for each group may be determined according to a type of the field data belonging to the group. For example, Group 1 includes two types of traffic packets: a traffic packet with source IP 192.168.0.1 and destination IP 192.168.0.2 and a traffic packet with source IP 192.168.0.2 and destination IP 192.168.0.1, in which case the best vector dimensions to sort the two types of packet may be determined to be two.

After sorting the field data into a plurality of groups, the pre-processor 200 may input the groups to respective traffic prediction models 310, 320, 330 for training. In this case, as many traffic prediction models 310, 320, and 330 as the number of groups may be created, and a specific property of each of the models 310, 320, and 330 may be optimized and established individually.

For convenience of explanation, an occasion when the field data is not sorted into groups will now be described.

Figure 4:
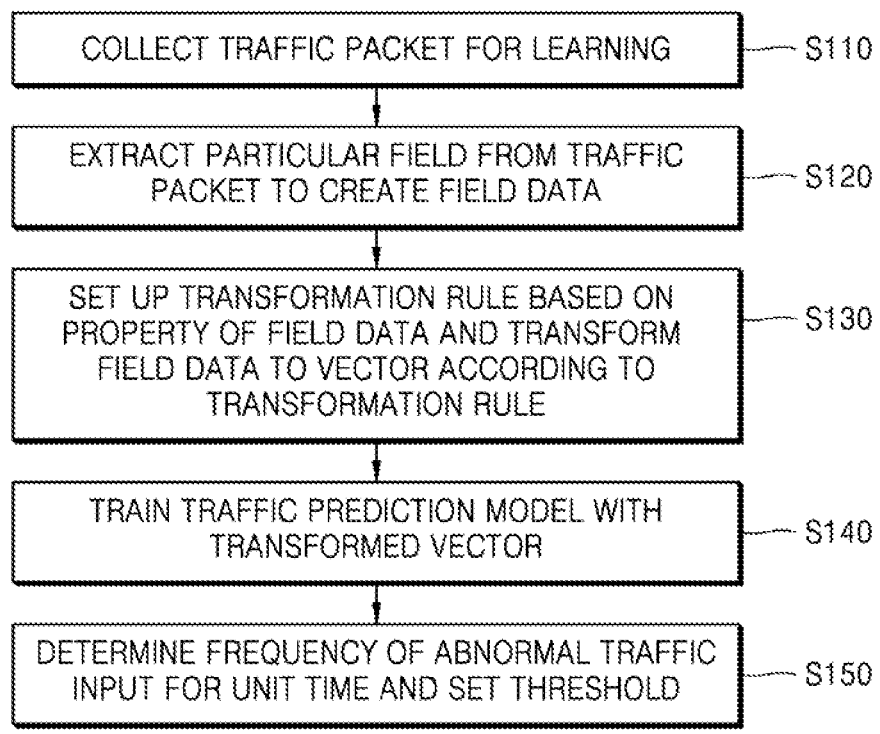
FIG. 4 is a flowchart illustrating a learning method of an abnormal traffic detection apparatus, according to an embodiment of the disclosure.

FIG. 4 is a flowchart illustrating a learning method of an abnormal traffic detection apparatus, according to an embodiment of the disclosure.

Referring to FIG. 4, the abnormal traffic detection apparatus 1000 collects traffic packets for learning, in operation S110.

The abnormal traffic detection apparatus 1000 extracts a particular field of the traffic packet to create field data, in operation S120. For example, the field extractor 100 may extract a source IP and a destination IP of each traffic packet to create the field data, as illustrated in the table 1.

The abnormal traffic detection apparatus 1000 creates a transformation rule based on the property of the field data and transforms the field data into a vector according to the transformation rule, in operation S130. The transformation rule is a rule for creating a one-hot vector from arbitrary field data based on a pattern observed from the traffic pattern for learning or by an administrator.

For example, the pre-processor 200 may generate a rule for transforming a traffic packet with source IP 192.168.0.1 and destination IP 192.168.0.2 into one-hot vector (1, 0, 0, 0, 0, 0). For subsequent input field data, if its source IP and destination IP are met with the rule, the field data may be vectorized to (1, 0, 0, 0, 0, 0).

The abnormal traffic detection apparatus 1000 trains the traffic prediction model 310 by inputting the vector, in operation S140. The traffic prediction model 310 may be implemented with the BRNN, and to increase the accuracy of prediction, may be trained many-to-one rather than many-to-many. The many-to-many method refers to a method in which the number of outputs is the same as the number of inputs, and the many-to-one method refers to a method in which there is one output predictive value regardless of the number of inputs. The many-to-one BRNN will be described in detail with reference to FIGS. 6A and 6B.

The abnormal traffic detection apparatus 1000 figures out the frequency of input abnormal traffic for a unit time and sets a threshold based on the frequency, in operation S150. The threshold may be set by the learning module 300 or the detector 400 after training of the traffic prediction model 310 is finished. Specifically, the threshold may be set based on a Z-score value or the average frequency of input abnormal traffic for the unit time, or may be controlled in a procedure of actual implementation.

Figure 5:
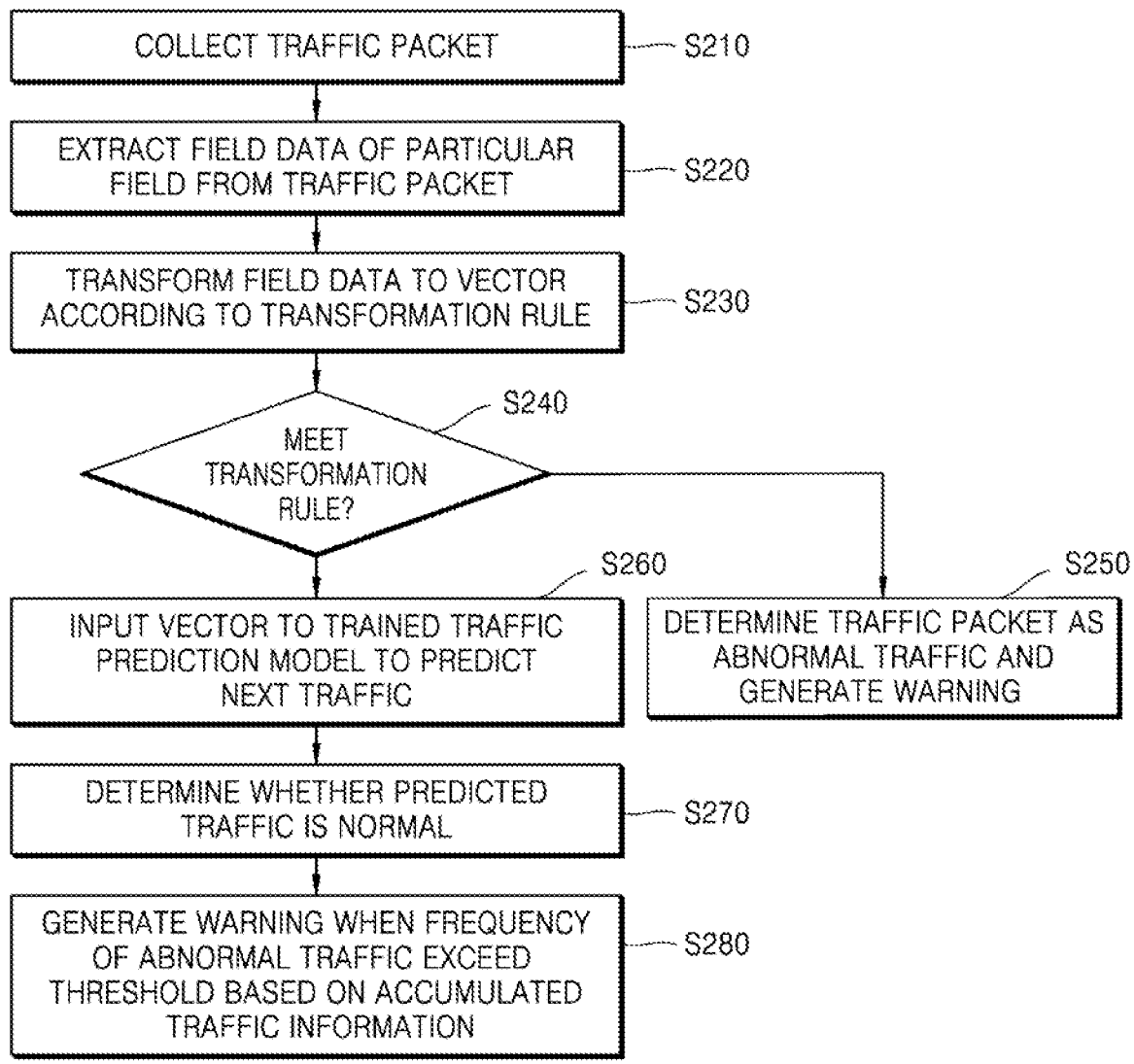
FIG. 5 is a flowchart illustrating a detection method of an abnormal traffic detection apparatus, according to an embodiment of the disclosure.

FIG. 5 is a flowchart illustrating a detection method of an abnormal traffic detection apparatus, according to an embodiment of the disclosure.

Referring to FIG. 5, the abnormal traffic detection apparatus 1000 collects traffic packets, in operation S210.

The abnormal traffic detection apparatus 1000 extracts field data of a particular field from the traffic packet, in operation S220. The field extracted from the traffic packet may be of the same type as a field used as training data.

The abnormal traffic detection apparatus 1000 transforms the field data into a vector according to a transformation rule, in operation S230. The transformation rule may correspond to the rule established in the operation S130 of FIG. 4.

The abnormal traffic detection apparatus 1000 determines whether the field data has a form that meets the transformation rule, in operation S240. For example, assume that a transformation rule is established to transform a data packet with a source IP and a destination IP as in Table 1 to a one-hot vector in six dimensions. In this case, when a data packet with source IP 192.168.0.1 and 192.168.0.5, which does not meet the established transformation rule, is input, the data packet may not be transformed into a vector.

When it is determined in operation S240 that the field data does not have the form that meets the transformation rule, the abnormal traffic detection apparatus 1000 determines that the input traffic packet is abnormal traffic and outputs a warning in operation S250. In this example, the pre-processor 200 may determine that the data packet having source IP 192.168.0.1 and destination IP 192.168.0.5 is abnormal traffic. In this case, the warning may be output right from the pre-processor 200 without passing the detector 400.

When the field data is transformed into a vector according to the transformation rule in operation S240, the abnormal traffic detection apparatus 1000 inputs the vector to the trained traffic prediction model 310 to predict a traffic that would come next. The traffic prediction model 310 may be implemented with the BRNN, which will be described in detail in connection with FIGS. 6A and 6B.

The abnormal traffic detection apparatus 1000 determines whether the predicted traffic is normal or abnormal in operation S270. A criterion of the determination may be predefined by the administrator.

The abnormal traffic detection apparatus 1000 generates a warning whether the frequency of the occurrence of abnormal traffic exceeds a threshold based on accumulated traffic information, in operation S280. The threshold may be set by the learning module 300.

Figure 6A:
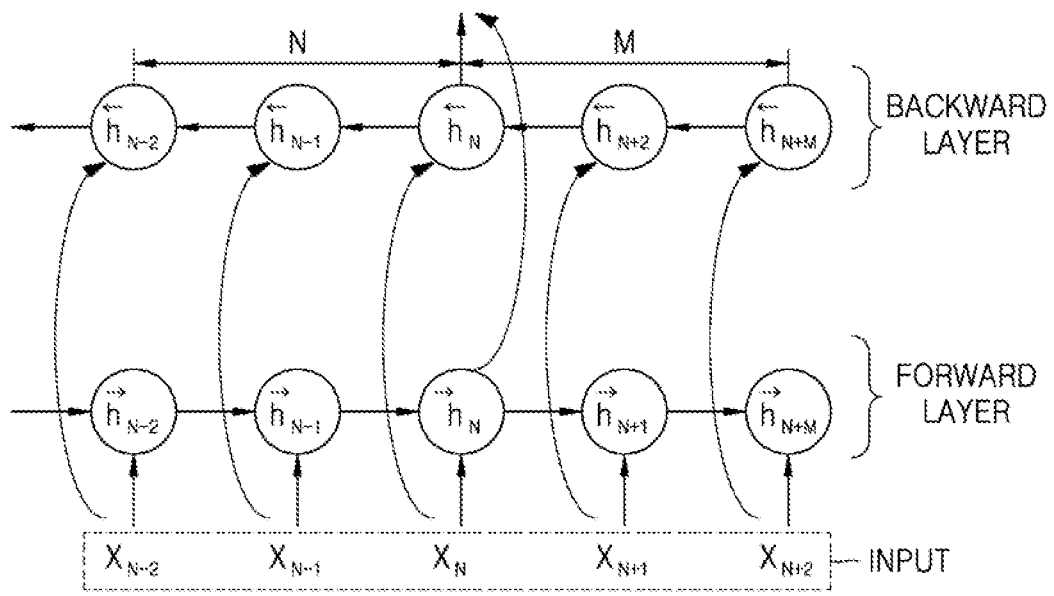
FIGS. 6A and 6B are diagrams for describing a traffic prediction model, according to an embodiment of the disclosure.
Figure 6B:
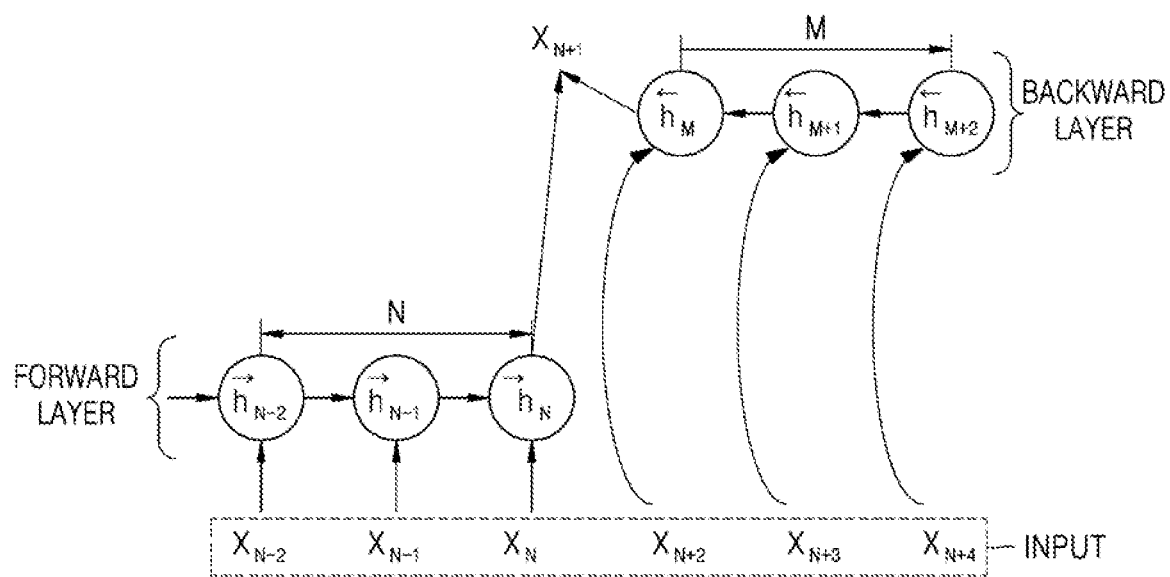

FIGS. 6A and 6B are diagrams for describing a traffic prediction model, according to an embodiment of the disclosure.

Referring to FIG. 6A, a common many-to-many BRNN model is shown. The BRNN model will now be described first before describing a difference between many-to-many and many-to-one in connection with FIG. 6B.

The BRNN includes a forward layer including units connected from the past to the future, and a backward layer including units connected from the future to the past. Current time (t=N) data may be estimated by connecting the two layers.

The BRNN is extended from a unidirectional RNN to address the problems of the unidirectional RNN having a structure of receiving past (t=N−2, N−1) sequences and predicting a label of current time (t=N) data. Backward connection, however, does not exist, so future time (t=N+1, N+2) data may not be used for estimation.

Another problem of the unidirectional RNN is that it is difficult to predict a very rare occasion. For example, assume four types of traffic packets, 'a', 'c', and 'd'. When 'a' and 'b' turn up 100 times by turns, and then 'c' and 'd' turn up in sequence, the unidirectional RNN may predict 'd' after 'c' but hardly predict whether traffic 'a' or traffic 'c' would come after 'b'. Since 'a' turns up 100 times and 'c' turns up once after 'b', the unidirectional RNN may predict that the next traffic packet would be 'a' after 'b' to achieve high accuracy.

As for the BRNN, when packet 'b' is input at the current time (t=N), a future (t=N+2) packet is used for reference to predict a packet that would come after 'b', in which case when the future packet is 'b', a packet at the time N+1 is predicted to be 'b', or when the future packet is d, the packet at the time N+1 is predicted to be 'c'.

Referring to FIG. 6B, a method of training a many-to-one model is shown. The many-to-one method refers to an occasion when a single predictive value is output regardless of the number of inputs.

In this case, unlike the many-to-many method, data that would come at the time N+1 may be predicted with the forward layer of the BRNN taking into account only data input up to the present and the backward layer taking into account only future data.

Specifically, assume a situation where 6 types of traffic packet as in the table 1 consecutively come in sequence. N refers to the number of data input up to the present and M refers to the number of data at future times. For example, N=3, M=2, the data input up to the present is $X\_N-2=(1, 0, 0, 0, 0, 0)$, $X\_N-1=(0, 1, 0, 0, 0, 0)$, and $X\_N=(0, 0, 1, 0, 0, 0)$.

The many-to-one BRNN-based traffic prediction model 310 may take into account the data at future times, X_M+1=(0,0,0,0,1,0) and X_M+2=(0,0,0,0,0,1) to predict X_N+1, and predict data that would come at the time N+1 to be (0,0,0,1,0,0).

Specifically, the traffic prediction model 310 may calculate a probability of data that would come at the time N+1, and predict a probability of (1, 0, 0, 0, 0, 0) to be 0, a probability of (0, 1, 0, 0, 0, 0) to be 0.2, a probability of (0, 0, 1, 0, 0, 0) to be 0.1, a probability of (0, 0, 0, 1, 0, 0) to be 0.7, a probability of (0, 0, 0, 0, 1, 0) to be 0, and a probability of (0, 0, 0, 0, 0, 1) to be 0.

In the meantime, the number of layers of the BRNN, N, M, the number of times of iterative training (Epoch), the number of neurons in the layer, a cell type, etc., may be selected to have suitable values by the user or administrator. For example, with iterative training, N may be selected to be 45, M be 2, Epoch be 300, the number of neurons in the layer be 45, and the cell type be gated recurrent unit (GRU).

Figure 7:
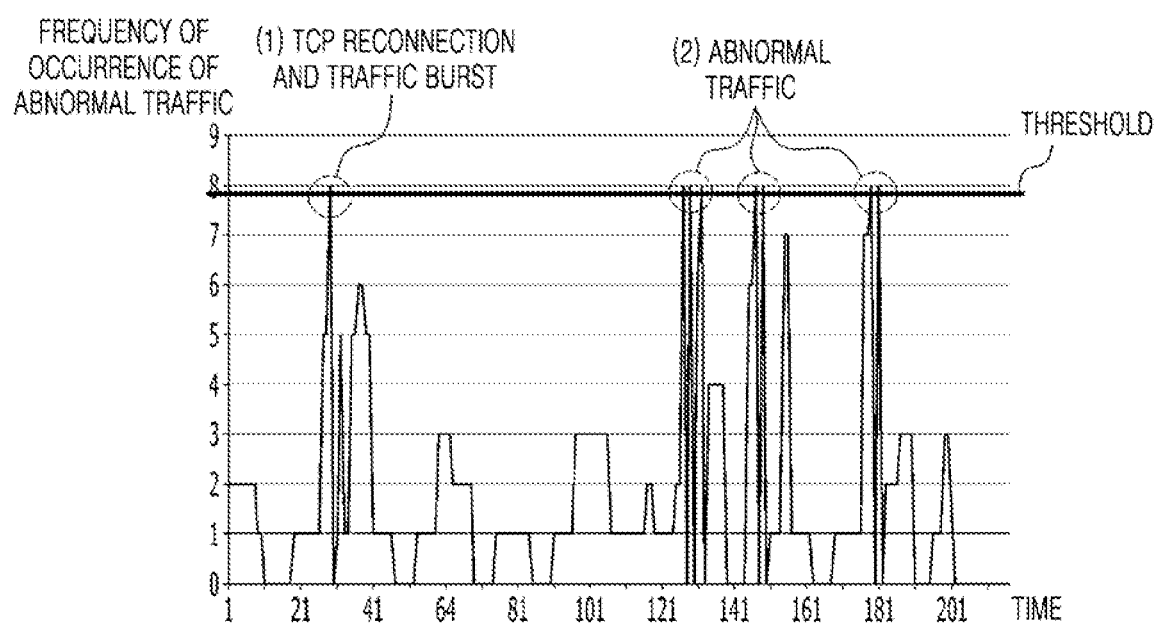
FIG. 7 shows a graph representing detection of abnormal traffic, according to an embodiment of the disclosure.

FIG. 7 is a graph representing detection of an abnormal traffic, according to an embodiment of the disclosure.

Referring to FIG. 7, the graph represents occasions when the frequency of detection of abnormal traffic for a unit time exceeds a threshold. The X-axis represents time over which traffic is input, and the Y-axis represents the frequency of detection of abnormal traffic.

For example, the administrator of the abnormal traffic detection apparatus 1000 may make a warning when the frequency of abnormal traffic is higher than a threshold, which may be set to 7.9. In this case, in a section where the abnormal traffic occurs eight or more times for the unit time, the abnormal traffic detection apparatus 1000 may generate a warning.

Figure 8:
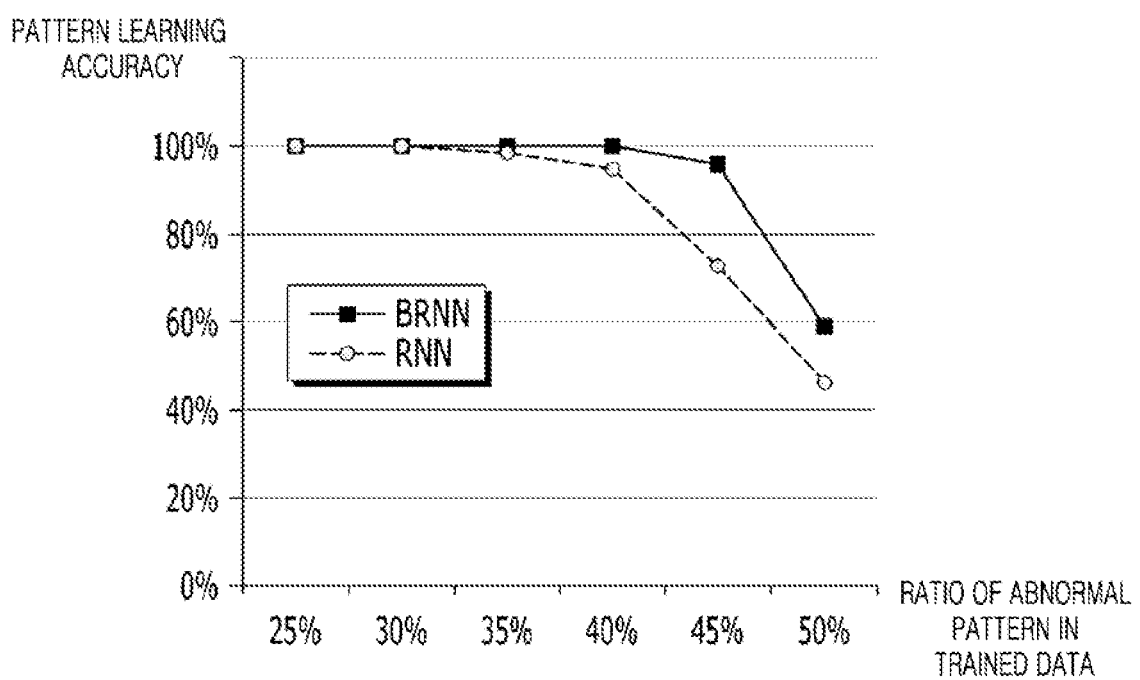
FIG. 8 shows a graph representing performance of traffic prediction models, according to an embodiment of the disclosure.

FIG. 8 shows a graph representing performance of traffic prediction models, according to an embodiment of the disclosure.

Referring to FIG. 8, the graph represents learning accuracies of a RNN-based model and a BRNN-based model based on ratios of abnormal traffic included in training data.

The higher the rate of abnormal traffic included in the training data, the lower the learning accuracy in both the RNN and BRNN, in which case, however, it may be seen that the learning accuracy of network traffic patterns of the BRNN is higher than the RNN even when the BRNN has a higher ratio of abnormal traffic than the RNN. In other words, it may be seen that the RNN has the tolerance for a 30% abnormal traffic pattern and the BRNN has the tolerance for a 40% abnormal traffic pattern. The abnormal traffic pattern may be generated due to congestion of the network, network reconnection for security reasons, etc.

Results of training the RNN-based model and the BRNN-based model may be represented as in the following table 3.

TABLE 3

| Model | Pattern learning rate | TPR | FPR | Degree of delay |
|---|---|---|---|---|
| RNN | 0.993 | 1.000 | 0.0112 | 1-4 inputs |
| BRNN | 1.000 | 1.000 | 0.0026 | 2 inputs |

In the table 3, the pattern learning rate refers to a learning rate for 137-long traffic packets, and the TRR (true positive rate) refers to the percentage of samples output as belonging to an actual positive class among samples belonging to the positive class, the higher the TPR, the better the model. The FPR (false positive rate) refers to the percentage of samples output as belonging to an actual positive class among samples not belonging to the positive class, the lower the FPR, the better the model. The degrees of delay refer to the number of input traffic packets required for normal operation of the model after detection of an abnormal traffic pattern.

It can be seen in the table 3 that the BRNN has learned a rare abnormal pattern that the RNN has not learned. Furthermore, the BRNN has a lower false positive rate than the RNN because the BRNN corrects the model with future input data. In this case, false positive traffic detected by the BRNN may occur when the network operates abnormally for a long time.

Figure 9:
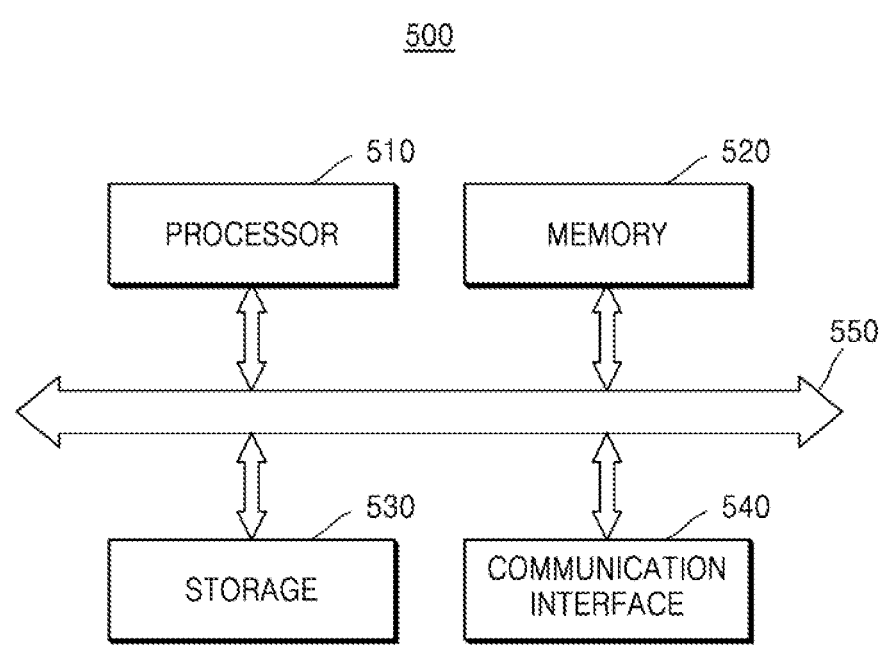
FIG. 9 is a hardware block diagram of a computing device, according to an embodiment of the disclosure.

FIG. 9 is a hardware block diagram of a computing device, according to an embodiment of the disclosure.

Referring to FIG. 9, the field extractor 100, the preprocessor 200, the learning module 300, or the detector 400 may run a program including instructions composed to execute the operations as described in the disclosure in a computing device 500 controlled by at least one processor.

Hardware of the computing device 500 may include at least one processor 510, a memory 520, a storage 530, and a communication interface 540, which may be interconnected by a bus 550. In addition, hardware of an input device and an output device may further be included. The computing device 500 may be equipped with many different software including an operating system to run the program.

The processor 510 is a device for controlling operation of the computing device 500, which may be any type of processor for processing the instructions included in the program, e.g., a central processing unit (CPU), a micro processor unit (MPU), a micro controller unit (MCU), a graphic processing unit (GPU), etc. The memory 520 loads the program for the processor 510 to process the instructions composed to perform the operation as described in the disclosure. The memory 520 may be e.g., a read only memory (ROM), a random access memory (RAM), etc. The storage 530 may store many different data, programs, etc., required to perform the operation as described in the disclosure. The communication interface 540 may be a wired/wireless communication module.

According to the disclosure, with the BRNN, a temporary network communication failure may not be falsely detected as abnormal traffic and a result of the detection may be easily analyzed.

Furthermore, detection may not be discontinued even after abnormal traffic occurs, and a deep learning model may continuously performing detection by taking the abnormal traffic as an input value, thereby guaranteeing continuity of detection.

Moreover, instead of simply outputting a decision of whether the next traffic would be normal or abnormal, a predictive value of the next traffic may be provided, thereby helping to determine a cause of the abnormality.

Also, in addition to an abnormal behavior caused by a cyber attack, a long-term failure of a network may be detected while the network is operated, which may improve security and may be used to determine conditions of the network.

Embodiments of the disclosure may be implemented not only in a device and method, but also in a program for realizing functions corresponding to the components as described above in the embodiments of the disclosure or a recording medium having the program recorded thereon.

Several embodiments of the disclosure have been described, but it will be understood that various modifications can be made without departing the scope of the disclosure. Thus, it will be apparent to those of ordinary skill in the art that the disclosure is not limited to the embodiments described, but can encompass the appended claims and their equivalents.

What is claimed is:

1. An operating method of a computing device operated by at least one processor, the operating method comprising:
    collecting traffic packets;
    extracting particular field data from the traffic packets, transforming the extracted particular field data to a vector with a reduced dimension for each traffic packet of the traffic packets, and creating training data with the vector for each traffic packet of the traffic packets;
    training a traffic prediction model with the training data, the traffic prediction model predicting a next input traffic packet from an input traffic packet and whether the next input traffic packet is abnormal; and
    predicting with the trained traffic prediction model a frequency of abnormal traffic packets to be input, and outputting an abnormal traffic warning by comparing the predicted frequency and a threshold.

2. The operating method of claim 1, wherein the particular field data comprises at least one of a type of data, a command type, flag information, port information, a source IP, or a destination IP included in each traffic packet of the traffic packets.

3. The operating method of claim 1, wherein the transforming comprises determining a type of a pattern of the collected traffic packets and transforming the particular field data for each traffic packet of the traffic packets to a vector with a minimum dimension to distinguish the type of the pattern.

4. The operating method of claim 2, wherein the vector comprises a one-hot vector having one element of true or '1' and the other elements of false or '0'.

5. The operating method of claim 1, further comprising:
    receiving a series of new traffic packets in sequence and inputting the new traffic packets to the traffic prediction model; and
    predicting a traffic packet to come after the new traffic packets.

6. The operating method of claim 5, further comprising:
    extracting the particular field data from the new traffic packets, transforming the particular field data to a vector, and generating a warning when the vector is different from a form of the training data, between the inputting and the predicting.

7. The operating method of claim 5, further comprising:
    determining whether the predicted traffic packet is normal traffic; and
    generating a warning when the predicted traffic packet is determined to be abnormal traffic.

8. A computing device comprising:
    a memory, and
    at least one processor configured to execute instructions of a program loaded in the memory,
    wherein the program includes instructions composed to execute the following operations:
    extracting particular field data from a plurality of collected traffic packets, transforming the extracted particular field data to a vector with a reduced dimension for each traffic packet of the plurality of collected traffic packets, and creating training data with the vector for each traffic packet of the plurality of collected traffic packets,
    training a traffic prediction model with the training data, the traffic prediction model predicting a next input traffic packet from an input traffic packet and whether the next input traffic packet is abnormal, and
    receiving a series of new traffic packets in sequence,
    extracting the particular field data from the new traffic packets, transforming the extracted particular field data to a vector and inputting the vector to the traffic prediction model, and
    predicting a traffic packet to come after the new traffic packet.

9. The computing device of claim 8, wherein the traffic prediction model is implemented with a bidirectional recurrent neural network (BRNN).

10. The computing device of claim 8, wherein the transforming comprises
    sorting the extracted field data into a plurality of groups according to a grouping rule, and
    transforming the field data belonging to each group of the plurality of groups to a vector in a minimum dimension to distinguish a type of the field data.

11. The computing device of claim 10, wherein the traffic prediction model is created as many as the number of groups, each traffic prediction model receiving a vector belonging to each group and performing learning.

12. The computing device of claim 8, wherein the training comprises
    predicting with the trained traffic prediction model a frequency of abnormal traffic packets to be input, and setting a threshold based on the frequency to output a warning.

13. The computing device of claim 12, wherein the program further includes instructions composed to execute the following operations:
    determining whether the predicted traffic packet is normal traffic; and
    when the predicted traffic packet is determined to be abnormal, computing a frequency of abnormal traffic packets input for a unit time and outputting a warning when the frequency exceeds the threshold.

* * * * *